W. P. DICKSON.
APPARATUS FOR MANUFACTURING INCANDESCENT LAMP PARTS.
APPLICATION FILED APR. 16, 1918.
1,368,552.
Patented Feb. 15, 1921.
2 SHEETS—SHEET 1.
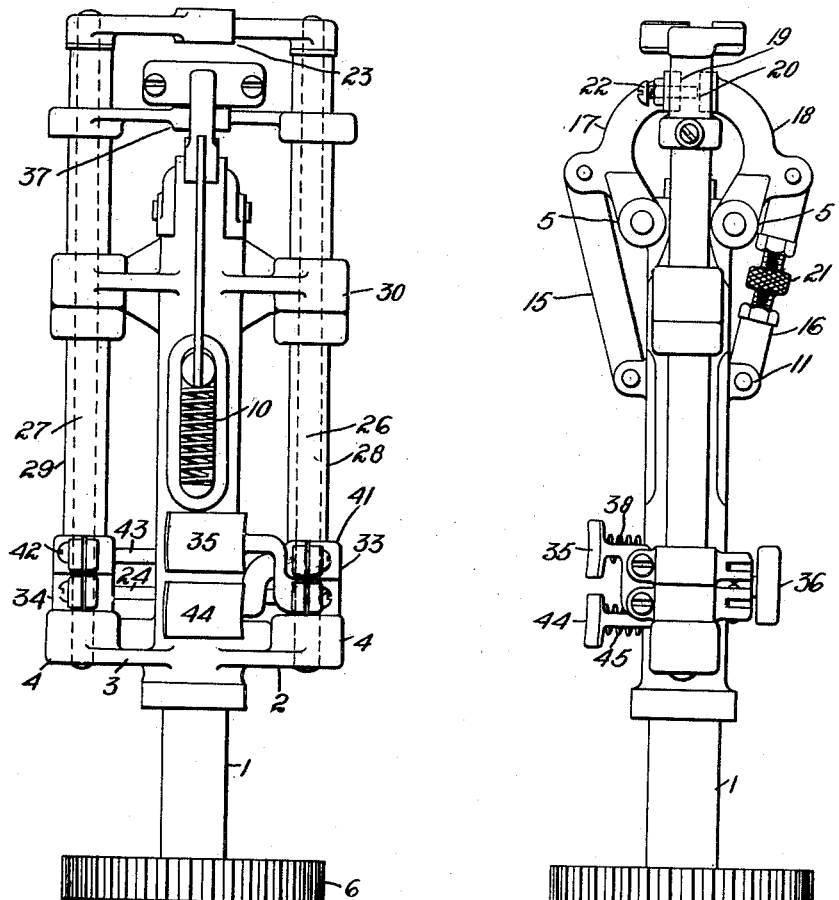
Fig.1.
Fig.2.
Fig.6.
WITNESSES:
INVENTOR
William P. Dickson
BY
ATTORNEY W. P. DICKSON.
APPARATUS FOR MANUFACTURING INCANDESCENT LAMP PARTS.
APPLICATION FILED APR. 16, 1918.

1,368,552.

Patented Feb. 15, 1921.
2 SHEETS—SHEET 2.

WITNESSES:
J. F. Wurmb.

INVENTOR
William P. Dickson.
BY
Wesley G. Carr
ATTORNEY

UNITED STATES PATENT OFFICE.

WILLIAM P. DICKSON, OF MAPLEWOOD, NEW JERSEY, ASSIGNOR TO WESTINGHOUSE LAMP COMPANY, A CORPORATION OF PENNSYLVANIA.

APPARATUS FOR MANUFACTURING INCANDESCENT-LAMP PARTS.

1,368,552. Specification of Letters Patent. Patented Feb. 15, 1921.

Application filed April 16, 1918. Serial No. 228,909.

*To all whom it may concern:*

Be it known that I, WILLIAM P. DICKSON, a citizen of the United States, and a resident of Maplewood, in the county of Essex and State of New Jersey, have invented a new and useful Improvement in Apparatus for Manufacturing Incandescent-Lamp Parts, of which the following is a specification.

This invention relates to machines for making incandescent lamp parts, such as the stems, and it has for one of its objects the provision of a machine element whereby the press and button of the stem may be formed substantially simultaneously.

The above object is effected by an improved stem-head mechanism, which is adapted to function in such a manner that one end of a flare tube and a piece of glass cane is consolidated in a press comprised of a flare and arbor, while, almost simultaneously, the free end of the cane is upset to form a button or enlargement adapted to permit the insertion of hooks or anchor wires for mounting the filament.

Other objects of the invention have to do with various features of construction and arrangements of parts which will manifest themselves upon a reading of the following description.

Figure 4:
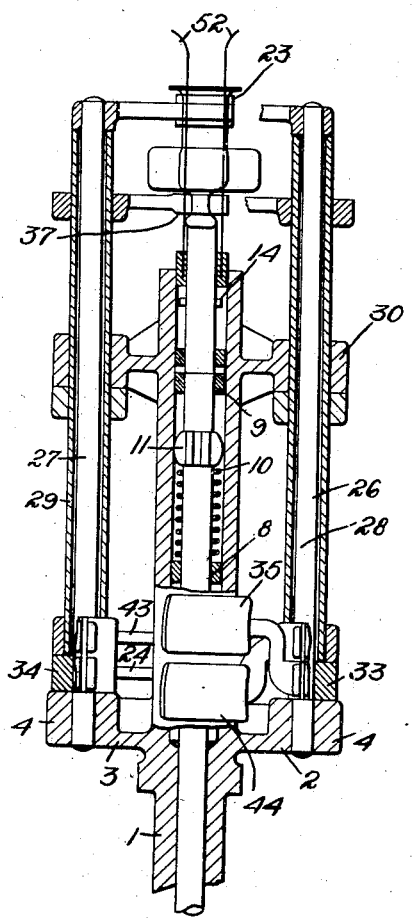
Figure 5:
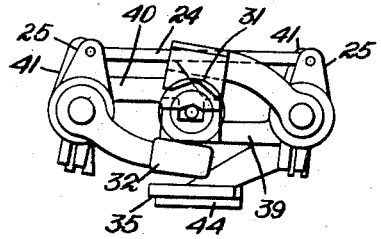
Figure 3:
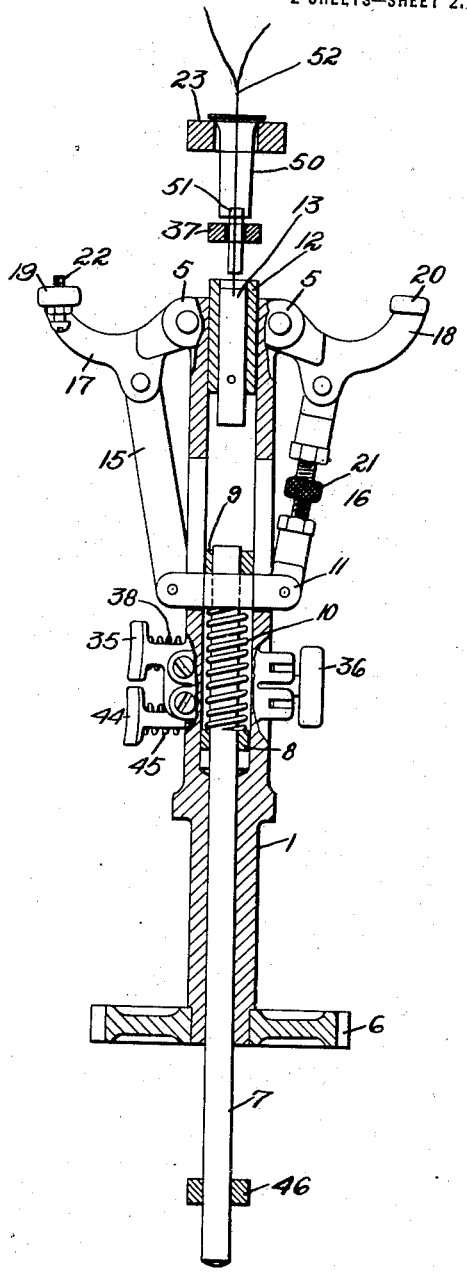

The invention is illustrated in the accompanying drawings in which Figure 1 is a front elevation of my stem and mount-forming or head mechanism; Fig. 2 is an end elevation of the mechanism shown in Fig. 1; Fig. 3 is a sectional view of the apparatus shown in Fig. 2, with the lamp parts positioned for the formation of a stem; Fig. 4 is a vertical sectional view of the forming head positioned as illustrated in Fig. 1; Fig. 5 is a plan view of the structure shown in Figs. 1 and 4, and Fig. 6 is a perspective view of a completed lamp stem including the leading-in wires.

Throughout the several figures, like reference characters refer to like parts.

Generally speaking, machines of which this invention is an improvement are well known in the art and are similar to the one described in a patent to Graybill No. 919,851, comprising, in the main, a central hub suitably mounted upon a base and provided with a plurality of radially extending arms which are rigidly secured to the hub and carry, at their outer ends, hubs which are adapted for independently mounting a corresponding number of work-holding devices or heads. Means are provided for permitting the rotation of the central hub and the outer hubs independently of each other, the former being indexed to rotate a given distance each step and the latter being adapted to constantly rotate during the interval while the central hub is stationary. The work-holding heads, carried in the outer hubs of the machine, come to rest after each movement of the central hub and are held in the path of a suitable flame designed to make the glass parts plastic so that, in the final operation or completion of a given cycle, a mount is formed.

Most of the apparatus just described is foreign to my invention and, consequently, is not illustrated or described in detail, as my invention resides in the improvement of the work-holding devices above described, whereby a greater number of operations may be performed upon a single unit and be accomplished more efficiently.

Heretofore it has been common practice to form a stem by consolidating a separately formed flare, an arbor having an enlargement or button and the lead-in wires into a self-contained unit. As previously stated, it is one of the objects of this invention to avoid the necessity of separately forming an arbor provided with a button by making this step substantially simultaneously with the making of the press in the lamp stem. In carrying out my invention, I provide the usual stem-head mechanism but so modified that the glass rod or cane intended for the arbor, together with the flare, is held in an assembled position and moved in the path of a suitable flame to render these parts plastic, after which a clamping mechanism forms the press and, simultaneously therewith, a reciprocating member, suitably actuated and capable of adjustment, as to its length of travel in an upward direction, is caused to move upwardly until it abuts against the lower end of the cane and forms a button thereon.

Referring to the drawings, 1 indicates a hollow shaft having integrally formed, about midway of its length, bifurcated portions or limbs 2 and 3 which terminate in bosses 4 provided with centrally located recesses. The upper part of the shaft 1 has a longitudinally slotted portion, and, upon the end of said shaft, is provided integrally formed ears 5. The lower end of the shaft 1 is slightly reduced to receive a gear wheel 6, which is adapted to mesh with another suitable gear wheel for rotating the head-forming mechanism.

A plunger rod 7 is located in the hollow shaft 1, for a purpose to be hereinafter set forth. It will be noted that the opening through the shaft 1, is of greater diameter at its upper portion than at its lower portion, thus permitting the attachment of collars 8 and 9, the former of which limits the movement, in one direction, of a helical spring 10, and the latter of which arrests the downward movement of the rod 7 by abutting against a collar portion of a bridge or yoke member 11. The helical spring 10, confined between the yoke 11 and the collar 8, functions in a manner hereinafter more fully described.

Frictionally mounted in the top of the shaft 1 is a sleeve 12 carrying a reciprocating plunger 13 having a pin 14 the ends of which extend into oppositely disposed longitudinal slots in the sleeve 12. The top surface of the sleeve 12 has recesses adapted to serve as well pockets or rests into which may be inserted the lead-in wires of the lamp.

The yoke 11 is provided with bifurcated ends in which are pivotedly secured links 15 and 16, which, in turn, are pivoted to the arms 17 and 18 of a press-forming clamp, said arms terminating, at their upper ends, in press-forming faces 19 and 20 respectively. The link 16 includes an adjusting device 21 which permits the centering of the press-forming faces 19 and 20 relative to the work, while a set screw 22, carried by face 19, provides means for spacing the press-forming faces relative to each other.

Seated in the recesses of the bosses 4 are rods 26 and 27 which are surrounded by hollow shafts 28 and 29, respectively. These members are held in upright positions by means of a bridge member 30 formed integrally with, or rigidly connected to, the hollow shaft 1. Secured to the tops of the rods 26 and 27 is a supporting clamp 23 comprising jaws 31 and 32, the former of which has a notch, the faces of which form an obtuse angle, while the latter has a plane face, this construction constituting a three-point contact for the work held between the clamp jaws. The rods 26 and 27 are rotatively actuated by means of collars 33 and 34 which are clamped thereon by means of screws. The collar 33 has a finger piece 35, and the two rods 26 and 27 are operated in unison by means of a link 24 pivoted at its ends to extensions or ears 25 formed upon the collars 33 and 34. A stationary finger piece 36, coöperatively positioned with respect to the finger piece 35 and suitably supported by the shaft 1, affords a grip for opening the clamp 23 which is normally maintained closed by means of a helical spring 38 held under compression and suitably retained in position intermediate the under face of the finger piece 35 and the shaft 1.

A second clamp 37, comprising jaws 39 and 40 secured to the shafts 28 and 29, is positioned just below the jaws of the clamp 23 and is constructed and operated in a manner similar thereto through the agency of collars 41 and 42, link 43, finger piece 44 and spring 45. It will be noted that the centers of the supporting clamps 23 and 37 lie in the axial line of the hollow shaft 1.

The upward movement of the plunger rod 7 is limited by an adjustable stop 46 located immediately beneath the gear wheel 6. By suitably adjusting the stop 46, the size of the button or enlargement formed upon the glass rod or cane may be regulated.

Having described the various parts of a mechanism embodying my invention, I will now outline its operation. An operator places in the clamp 23 a flare 50 formed from a short length of glass tubing, and in the clamp 37 a piece of glass cane 51 of suitable length, the positioning of these parts relative to each other being substantially as shown in Fig. 3. The lead-in wires 52 are then inserted into the well pockets formed in the sleeve 12 and the stem head is moved into the path of a flame. The glass parts are first given a preliminary heating and then raised to a plastic condition by a more intense heat, the stem head being rotated while in the path of the gas flame. Upon the glass parts reaching a proper plastic condition, the plunger rod 7 is forced upwardly, by means of a treadle (not shown), to effect the closure of the press-forming clamp comprising arms 17 and 18, thereby making the press of the lamp mount. The closure of the press-forming clamp is effected primarily by means of the spring 10, which, on account of its ability to undergo compression, will maintain the jaws 19 and 20 closed during the continued upward travel of the plunger rod 7. The plunger rod 7, coming in contact with the plunger 13, moves the same upwardly until it engages the lower end of the cane or glass rod 51. By further upward movement of the rod 7, an enlargement or button is formed upon the cane at the point of contact with the plunger 13. As previously stated, the upward movement of the rod 7 is limited by the stop 46 coming into engagement with the lower end of the shaft 1. It will be seen that the relation of the press-forming clamp to the button-forming parts is such that the former functions slightly in advance of the latter. The press-forming clamp, when actuated, consolidates the lower portion of the flare 50, cane 51 and the lead-in wires 52 into a press, and the clamp is held in its operated position until the formation of the button is completed. This sequence of operation prevents the displacement of the cane 51 by the plunger rod 7 during the process of making the button. It will be noted that, although the forming of the press and the button may not actually take place simultaneously, yet their formation is in close sequence and within a single cycle of heating the glass parts.

From a reading of the above description it will be apparent that, as a result of my invention, it is possible to join what has heretofore been carried out by two separate and distinct operations into a single operation, with a consequent reduction in the cost of manufacture and a speeding up of the work turned out.

While this invention has been set forth in certain preferred embodiments, it will be understood that modifications may be made without departing from the spirit and scope thereof.

What I claim is:

1. In apparatus for manufacturing incandescent-lamp parts, the combination of means for holding a flare, means for supporting a piece of glass cane, means for associating lead-in wires with said flare and cane, and means for consolidating said work parts in a press and forming a button on one end of the said cane.

2. In apparatus for manufacturing incandescent lamp parts, the combination of a flare-supporting clamp, a glass cane-supporting clamp, a press-forming clamp for consolidating said flare and cane when in a plastic condition, and means for forming a button upon the exposed end of the cane, said means functioning substantially simultaneous with the press-forming means.

3. In apparatus for manufacturing incandescent lamp parts, the combination of means for holding a flare, means for supporting a piece of glass cane, means for associating leading-in wires with the said flare and cane, and means for consolidating said work parts into a press and forming a button upon one end of the said cane, said latter-mentioned means being functioned by a single actuating member.

4. In apparatus for manufacturing incandescent lamp parts, the combination of a flare-supporting clamp, a glass cane-supporting clamp, a press-forming clamp for consolidating said flare and cane when in a plastic condition, and means for forming a button upon the exposed end of the cane substantially simultaneous with the formation of the stem, said button-forming means including a reciprocating plunger rod adapted to effect engagement with the stem portion of the mount, and actuate the mount-forming clamp.

In testimony whereof, I have hereunto subscribed my name this April first 1918.

WILLIAM P. DICKSON.